United States Patent
Kanungo et al.

(10) Patent No.: US 9,524,335 B2
(45) Date of Patent: Dec. 20, 2016

(54) CONFLATING ENTITIES USING A PERSISTENT ENTITY INDEX

(71) Applicant: Microsoft Corporation, Redmond, WA (US)

(72) Inventors: Tapas Kanungo, Redmond, WA (US); Ashok Ponnuswami, Kirkland, WA (US); Richard Jungiang Qian, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 365 days.

(21) Appl. No.: 13/920,291

(22) Filed: Jun. 18, 2013

(65) Prior Publication Data

US 2014/0372441 A1 Dec. 18, 2014

(51) Int. Cl.
*G06F 17/30* (2006.01)
(52) U.S. Cl.
CPC ... *G06F 17/30604* (2013.01); *G06F 17/30539* (2013.01)
(58) Field of Classification Search
CPC ............ G06F 17/3053; G06F 17/30539; G06F 17/30321; G06F 17/30613
USPC ........................................ 707/736, 737, 741
See application file for complete search history.

(56) References Cited

U.S. PATENT DOCUMENTS

| | | | |
|---|---|---|---|
| 6,898,597 B1 * | 5/2005 | Cook et al. | |
| 7,895,243 B1 * | 2/2011 | Baer | G06Q 30/0603 707/805 |
| 8,082,258 B2 | 12/2011 | Kumar et al. | |
| 8,244,701 B2 | 8/2012 | Sun et al. | |
| 9,298,702 B1 * | 3/2016 | Faletti | G06F 17/2785 |
| 2007/0288436 A1 * | 12/2007 | Cao | 707/3 |
| 2011/0196855 A1 | 8/2011 | Wable et al. | |
| 2011/0270820 A1 | 11/2011 | Agarwal | |
| 2012/0005227 A1 * | 1/2012 | Nagano et al. | 707/769 |

OTHER PUBLICATIONS

Raj, et al., "Cloudpress 2.0: A MapReduce Approach for News Retrieval on the Cloud", In Proceedings of Future Generation Computation System, Apr. 17, 2012, 18 pages.
Arden, "How to Implement a Search Engine Part 1: Create Index", Published on: May 30, 2011, Available at: http://www.ardendertat.com/2011/05/30/how-to-implement-a-search-engine-part-1-create-index/.

(Continued)

*Primary Examiner* — Monica Pyo
(74) *Attorney, Agent, or Firm* — Jessica Meyers; Tom Wong; Micky Minhas

(57) ABSTRACT

Systems, methods, and computer-readable storage media are provided for conflating entities using a persistent entity index. Information (including attributes) pertaining to a plurality of entities is received. The received information is either matched with one or more existing entities in the persistent entity index or, if no match is found, selected for addition to the persistent entity index. The persistent entity index includes entity-attribute pairs associated therewith. Attributes associated with matching entities for which information is received are aggregated and/or reconciled with the entity-attribute pairs associated with existing entities included in the persistent entity index. The persistent entity index may be incrementally updated at predetermined time intervals to insure the accuracy and freshness of the information associated therewith.

17 Claims, 4 Drawing Sheets

(56) References Cited

OTHER PUBLICATIONS

Klavans, et al., "A Natural Language Approach to Multi-Word Term Conflation", In Proceedings of the Third Delos Workshop—Cross-Language Information Retrieval, Mar. 5, 1997, 8 pages.

* cited by examiner

CONFLATING ENTITIES USING A PERSISTENT ENTITY INDEX

BACKGROUND

In the online search environment today, users often conduct searches designed to elicit information about a particular entity. An "entity," as the term is utilized herein, is an instance of an abstract concept or object, including, for instance, a person, an event, a location, a business, a movie, and the like. Entities include attributes associated therewith (e.g., a date of birth or city of birth associated with a person entity, or a manufacturer or color associated with an entity such as a piece of furniture), each attribute having an associated value. Entities also include relationships to other entities (e.g., a person entity may have a relationship with another person entity that is a spouse of the person entity, or a furniture item entity may have a relationship with other furniture item entities having the same manufacturer or style as the furniture entity).

Entity-attribute pairs are received from various content feeds. Often, more than one content feed contains entity-attribute pairs about the same entity. However, as the content feeds are not always provided utilizing a common schema, determining that an entity-attribute pair from one content feed—or even an entity itself—is the same as an entity or entity-attribute pair received from another content feed is often a difficult task. Complicating the issue is the fact that a value associated with a particular entity-attribute pair from two different content feeds may not be the same, begging an answer to the questions of not only whether the two sources of content are related to the same entity but also which one is correct.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for conflating entities using a persistent entity index. Information (including attributes) pertaining to a plurality of entities is received. The received information is either matched with one or more existing entities in the persistent entity index or, if no match is found, selected for addition to the persistent entity index. The persistent entity index includes entity-attribute pairs associated therewith. Attributes associated with matching entities for which information is received are aggregated and/or reconciled with the entity-attribute pairs associated with existing entities included in the persistent entity index. In embodiments, the persistent entity index is incrementally updated at predetermined time intervals to insure the accuracy and freshness of the information associated therewith.

Utilizing embodiments of the present invention, information already associated with the persistent entity index does not need to be re-matched each time an additional item of information is received due to the persistent nature of the index. Rather, only the received information items need be matched to the already existing entities in the entity index. Thus, matching of additional information on an incremental basis is enabled, saving time and resources in maintaining the index.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1:
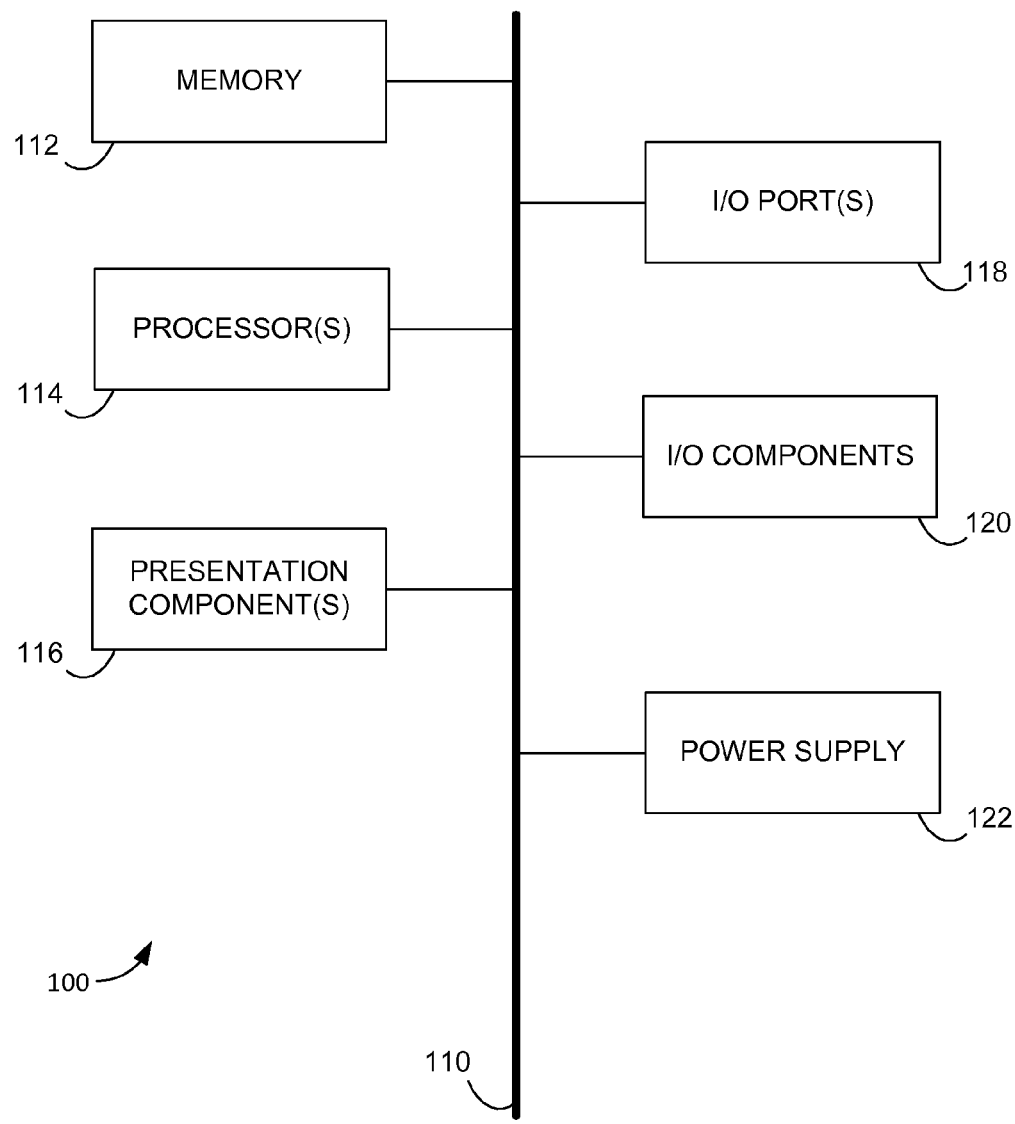
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for conflating entities using a persistent entity index. "Entities," as the term is utilized herein, are instances of abstract concepts or objects, including, for instance, people, events, locations, businesses, movies, and the like. Entities include attributes associated therewith, each attribute having an associated value. Entities also include relationships to other entities. In accordance with embodiments of the present invention, received information pertaining to entities is either matched with one or more existing entities in the persistent entity index or, if no match is found, selected for addition to the persistent entity index. The persistent entity index includes entity-attribute pairs associated therewith. Attributes associated with matching entities for which information is received are aggregated and/or reconciled with the entity-attribute pairs associated with existing entities included in the persistent entity index. In embodiments, the persistent entity index is incrementally updated at predetermined time intervals to insure the accuracy and freshness of the information associated therewith.

Utilizing embodiments of the present invention, information already associated with the persistent entity index does not need to be re-matched each time an additional item of information is received due to the persistent nature of the index. Rather, only the received information items need be matched to the already existing entities in the entity index. Thus, matching of additional information on an incremental basis is enabled, saving time and resources in maintaining the index.

Accordingly, one embodiment of the present invention is directed to one or more computer-readable storage media storing computer-useable instructions that, when used by one or more computing devices, cause the one or more computing devices to perform a method for conflating entities using a persistent entity index. The method includes receiving information about an entity, the information including at least one attribute associated with the entity; matching the entity with one or more existing entities in the persistent entity index, the persistent entity index having entity-attribute pairs associated therewith; and aggregating the at least one attribute associated with the entity with the entity-attribute pairs associated with the persistent entity index.

In another embodiment, the present invention is directed to a method being performed by one or more computing devices including at least one processor, the method for maintaining a persistent entity index. The method includes receiving information about an entity from a plurality of sources; detecting a match between the information about the entity from at least two of the plurality of sources; aggregating the information about the entity from the at least two matching sources; and storing the aggregated information in the persistent entity index.

In yet another embodiment, the present invention is directed to a system including an entity conflation engine having one or more processors and one or more computer-readable storage media, and a data store coupled with the entity conflation engine. The entity conflation engine is configured to receive information about an entity, the information including at least one attribute associated with the entity; match the entity with one or more existing entities in a persistent entity index, the persistent entity index having entity-attribute pairs associated therewith; aggregate the at least one attribute associated with the entity with the entity-attribute pairs associated with the persistent entity index; and rank the entity with respect to the one or more attached existing entities using a machine-learning approach.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including, but not limited to, hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone, joystick, game pad, satellite dish, scanner, printer, wireless device, a controller, such as a stylus, a keyboard and a mouse, a natural user interface (NUI), and the like.

A NUI processes air gestures (i.e., motion or movements associated with a user's hand, hands, or other parts of the user's body, or instruments coupled with the user's body), voice, or other physiological inputs generated by a user. These inputs may be interpreted as entities, attributes, entity-relationships, and the like. A NUI implements any combination of speech recognition, touch and stylus recognition, facial recognition, biometric recognition, gesture recognition both on screen and adjacent to the screen, air gestures, head and eye tracking, and touch recognition associated with a display on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices. The computer-useable instructions form an interface to allow a computer to react according to a source of input. The instructions cooperate with other code segments to initiate a variety of tasks in response to data received in conjunction with the source of the received data.

Furthermore, although the terms "entity conflation engine" and/or "knowledge processing engine" are used herein, it will be recognized that these terms may also encompass servers, Web browsers, sets of one or more processes distributed on one or more computers, one or more stand-alone storage devices, sets of one or more other computing or storage devices, any combination of one or more of the above, and the like.

As previously mentioned, embodiments of the present invention are generally directed to systems, methods, and computer-readable storage media for conflating entities using a persistent entity index. Information (including attributes) pertaining to a plurality of entities is received. The received information is either matched with one or more existing entities in the persistent entity index or, if no match is found, selected for addition to the persistent entity index. The persistent entity index includes entity-attribute pairs associated therewith. Attributes associated with matching entities for which information is received are aggregated and/or reconciled with the entity-attribute pairs associated with existing entities included in the persistent entity index. In embodiments, the persistent entity index is incrementally updated at predetermined time intervals to insure the accuracy and freshness of the information associated therewith.

Figure 2:
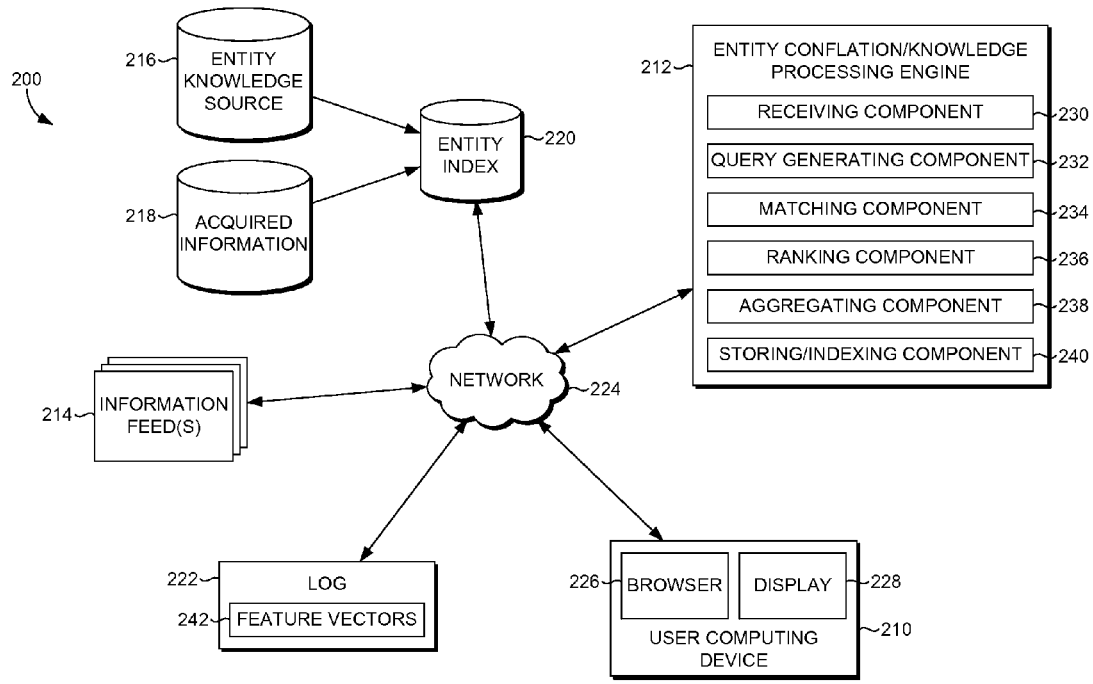
FIG. 2 is a block diagram of an exemplary computing system in which embodiments of the invention may be employed.

Referring now to FIG. 2, a block diagram is provided illustrating an exemplary computing system 200 in which embodiments of the present invention may be employed. Generally, the computing system 200 illustrates an environment in which entities may be conflated using a persistent entity index and in which a persistent entity index may be updated and maintained, in accordance with embodiments of the present invention. Among other components not shown, the computing system 200 generally includes a user computing device 210 and an entity conflation/knowledge processing engine 212 in communication with one another via a network 224. The network 224 may include, without limitation, one or more local area networks (LANs) and/or wide area networks (WANs). Such networking environments are commonplace in offices, enterprise-wide computer networks, intranets and the Internet. Accordingly, the network 224 is not further described herein.

It should be understood that any number of user computing devices 210 and/or entity conflation/knowledge processing engines 212 may be employed in the computing system 200 within the scope of embodiments of the present invention. Each may comprise a single device/interface or multiple devices/interfaces cooperating in a distributed environment. For instance, the entity conflation/knowledge processing engine 212 may comprise multiple devices and/or modules arranged in a distributed environment that collectively provide the functionality of the entity conflation/knowledge processing engine 212 described herein. Additionally, other components or modules not shown also may be included within the computing system 200.

In some embodiments, one or more of the illustrated components/modules may be implemented as stand-alone applications. In other embodiments, one or more of the illustrated components/modules may be implemented via the user computing device 210, the entity conflation/knowledge processing engine 212, or as an Internet-based service. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of entity conflation/knowledge processing engines and/or user computing devices. By way of example only, the entity conflation/knowledge processing engine 212 might be provided as a single computing device (as shown), a cluster of computing devices, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more components/modules may be carried out by hardware, firmware, and/or software. For instance, various functions may be carried out by a processor executing instructions stored in memory.

The user computing device 210 may include any type of computing device, such as the computing device 100 described with reference to FIG. 1, for example. Generally, the user computing device 210 includes a browser 226 and a display 228. The browser 226, among other things, is configured to render search engine home pages (or other online landing pages) and search engine results pages (SERPs) including entities, in association with the display 228 of the user computing device 210. The browser 226 is further configured to receive user input of requests for various web pages (including search engine home pages), receive user input search queries (generally input via a user interface presented on the display 228 and permitting alpha-numeric and/or textual input into a designated search input region) and to receive content for presentation on the display 228, for instance, from the entity conflation/knowledge processing engine 212. It should be noted that the functionality described herein as being performed by the browser 226 may be performed by any other application, application software, user interface, or the like capable of rendering Web content. It further should be noted that embodiments of the present invention are equally applicable to mobile computing devices and devices accepting touch and/or voice input. Any and all such variations, and any combination thereof, are contemplated to be within the scope of embodiments of the present invention.

The entity conflation/knowledge processing engine 212 of FIG. 2 is configured to, among other things, receive information pertaining to a plurality of entities and aggregate and/or reconcile the received information with existing entity information associated with a persistent entity index. The entity conflation/knowledge processing engine 212 further is configured to update, supplement and add received entity information to the persistent entity index. The illustrated entity conflation/knowledge processing engine 212 has access to an entity knowledge source or database 216. The entity knowledge source 216 is configured to store information related to entities, attributes, entity-attribute pairs, attribute values, entity relationships, entity information sources, and the like. In embodiments, the entity knowledge source 216 is configured to be searchable for one or more of the items stored in association therewith. It will be understood and appreciated by those of ordinary skill in the art that the information stored in association with the entity knowledge source 216 may be configurable and may include any information relevant to entities, attributes, attribute values, entity information sources, and the like. The content and volume of such information are not intended to limit the scope of embodiments of the present invention in any way. Further, though illustrated as a single, independent component, the entity knowledge source 216 may, in fact, be a plurality of storage devices, for instance a database cluster, portions of which may reside in association with the entity conflation/knowledge processing engine 212, the user computing device 210, another external computing device (not shown), and/or any combination thereof. In embodiments, the entity knowledge source 216 information is stored as a graph-based representation.

The illustrated entity conflation/knowledge processing engine 212 also has access to an acquired information data store 218. The acquired information data store 128 is configured to store information that may be acquired about the entities included in the entity knowledge source 216. Generally, such information includes user-facing data such as, without limitation, queries associated with the entities, click counts associated with the entities (for instance, of all the attributes associated with an entity, which one(s) do people select most often), and the like. In embodiments, the acquired information data store 218 is configured to be searchable for one or more of the items stored in association therewith. It will be understood and appreciated by those of ordinary skill in the art that the information stored in association with the acquired information data store 218 may be configurable and may include any data relevant to the entities associated with the entity knowledge source 216. The content and volume of such information are not intended to limit the scope of embodiments of the present invention in any way. Further, though illustrated as a single, independent component, the acquired information data store 218 may, in fact, be a plurality of storage devices, for instance a database cluster, portions of which may reside in association with the entity conflation/knowledge processing engine 212, the user computing device 210, another external computing device (not shown), and/or any combination thereof.

The information in the entity knowledge source 216 and the acquired information data store 218 are combined to form the persistent entity index 220. In embodiments, the persistent entity index 220 itself is configured to be searchable for one or more of the items indexed in association therewith. Further, though illustrated as a single, independent component, the persistent entity index 220 may, in fact, be a plurality of indices, portions of which may reside in association with the entity conflation/knowledge processing engine 212, the user computing device 210, another external computing device (not shown), and/or any combination thereof.

As illustrated, the persistent entity index 220 is an inverted index that includes all of the terms that appear in association with an entity (like an index at the back of a printed book). Any terms that are mentioned in association with any entity in the entity knowledge source 216 are included in the persistent entity index 220. When the index 220 is queried, as more fully described below, all entities (not all documents) having a queried term are identified as potential matches for the query.

As previously set forth, the entity conflation/knowledge processing engine 212 of FIG. 2 is configured to, among other things, receive information pertaining to a plurality of entities and aggregate and/or reconcile the received information with existing entity information associated with the persistent entity index 220. The entity conflation/knowledge processing engine 212 further is configured to update, supplement and add received entity information to the persistent entity index 220. As illustrated, the entity conflation/knowledge processing engine 212 includes a receiving component 230, a query generating component 232, a matching component 234, a ranking component 236, an aggregating component 238, and a storing/indexing component 240.

The receiving component 230 of the entity conflation/knowledge processing engine 212 is configured to receive information about an entity (e.g., from an information feed 214 and/or a query generated by the query generating component 232, more fully described below). In embodiments, such information may be received from a plurality of sources or information feeds 214, each information feed 214 providing data as either structured or unstructured data. In embodiments, the information received includes at least one attribute associated with an entity.

The query generating component 232 of the entity conflation/knowledge processing engine 212 is configured to generate queries from incoming information received about an entity. For instance, a generated query may be comprised of a title associated with an entity for which information is received by the receiving component 230. Generated queries then may be utilized to query the persistent entity index 220 to determine if any matches with existing entities and/or entity-attribute pairs exist.

The matching component 234 of the entity conflation/knowledge processing engine 212 is configured to incrementally match entities (that is, entities received from a plurality of sources, for instance, information feeds 214) and associated entity information (e.g., attributes and attribute values) with existing entities in the persistent entity index 220. In embodiments, the matching component 234 further is configured to detect matches among information associated with entities received from the plurality of sources. In embodiments, the matching component 234 is configured to score purported matches, for instance, utilizing a threshold matching value, such that only those potential matches having a score within a predetermined range are considered true matches for ranking (more fully described below). In embodiments, matching scores may be stored in a log 222 associated with the computing system 200. Also stored may be feature vectors 242 or other information items the system 200 may find useful in training the machine-learning algorithms used in association therewith.

In embodiments, the matching component 234 matches information received about an entity with one or more existing entities using at least one of graph data and web context. In embodiments, if received information about an entity is not able to be matched with an entity stored in association with the persistent entity index 220, the entity (and associated information) is selected for addition to the persistent entity index 220.

The ranking component 236 of the entity conflation/knowledge processing engine 212 is configured to rank entities for which entity information is received with respect to matching entities from the persistent entity index 220. The ranking component 236 further is configured to rank matched entities with queries generated by the query generating component 232. In embodiments, the ranking component 236 ranks entities utilizing a machine-learning approach. In embodiments, the ranking component 236 may use context associated with one or more users in ranking.

The aggregating component 238 of the entity conflation/knowledge processing engine 212 is configured to aggregate attributes and attribute values associated with received entities with entity-attribute pairs existing in the persistent entity index 220. In embodiments, the aggregating component 238 aggregates entity information obtained from a plurality of sources (e.g., information feeds 214). In embodiments, the aggregating component 238 further is configured to reconcile differing attribute values from different entity information sources (e.g., the information feeds 214 and/or the persistent entity index 220), for instance, utilizing a machine-learning approach.

The storing/indexing component 240 of the entity conflation/knowledge processing engine 212 is configured to incrementally update the persistent entity index 220, for instance, at pre-determined time intervals. In embodiments, the incremental updating of the persistent entity index 220 utilizes at least one of graph data and web-context. The storing/indexing component 240 additionally is configured to store aggregated information from multiple sources in the persistent entity index 220 and to index new entities received that have no existing match in the persistent entity index 220.

Figure 3:
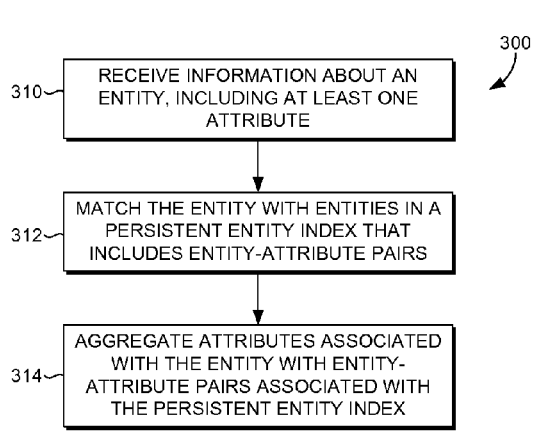
FIG. 3 is a flow diagram showing an exemplary method for conflating entities using a persistent entity index, in accordance with an embodiment of the present invention.

Turning now to FIG. 3, a flow diagram is illustrated showing an exemplary method 300 for entity conflation using a persistent entity index, in accordance with an embodiment of the present invention. As indicated at block 310, information about an entity is received (e.g., utilizing the receiving component 230 of the entity conflation/knowledge processing engine 212 of FIG. 2), the information including at least one attribute associated with the entity. As indicated at block 312, the entity is matched (e.g., utilizing the matching component 234 of the entity conflation/knowledge processing engine 212 of FIG. 2) with one or more existing entities in the persistent entity index, the persistent entity index having entity-attribute pairs associated therewith. The at least one attribute associated with the entity index is aggregated with the entity-attribute pairs associated with the persistent entity index, for instance, utilizing the aggregating component 238 of the entity conflation/knowledge processing engine 212 of FIG. 2. This is indicated at block 314.

Figure 4:
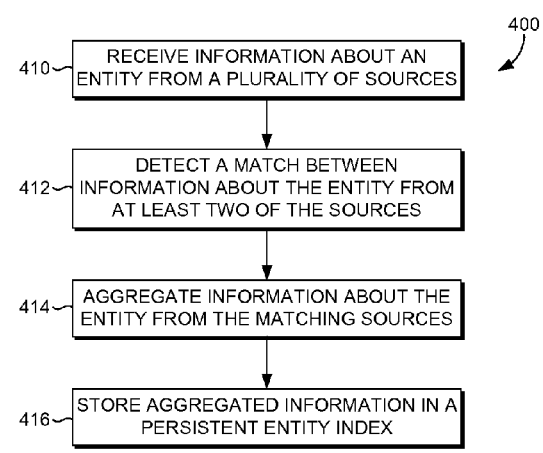
FIG. 4 is a flow diagram showing an exemplary method for maintaining a persistent entity index, in accordance with an embodiment of the present invention.

With reference now to FIG. 4, a flow diagram is illustrated showing an exemplary method 400 for maintaining a persistent entity index, in accordance with an embodiment of the present invention. As indicated at block 410, information about an entity is received from a plurality of sources (e.g., utilizing the receiving component 230 of the entity conflation/knowledge processing engine 212 of FIG. 2). As indicated at block 412, a match between the information about the entity from at least two of the plurality of sources is detected (e.g., utilizing matching component 234 of the entity conflation/knowledge processing engine 212 of FIG. 2). The information about the entity from the at least two matching sources is aggregated (e.g., utilizing the aggregating component 238 of the entity conflation/knowledge processing engine 212 of FIG. 2), as indicated at block 414. As indicated at block 416, the aggregated information is stored, for instance, utilizing the storing/indexing component 240 of the entity conflation/knowledge processing engine 212 of FIG. 2, in a persistent entity index (e.g., entity index 220 of FIG. 2).

Figure 5:
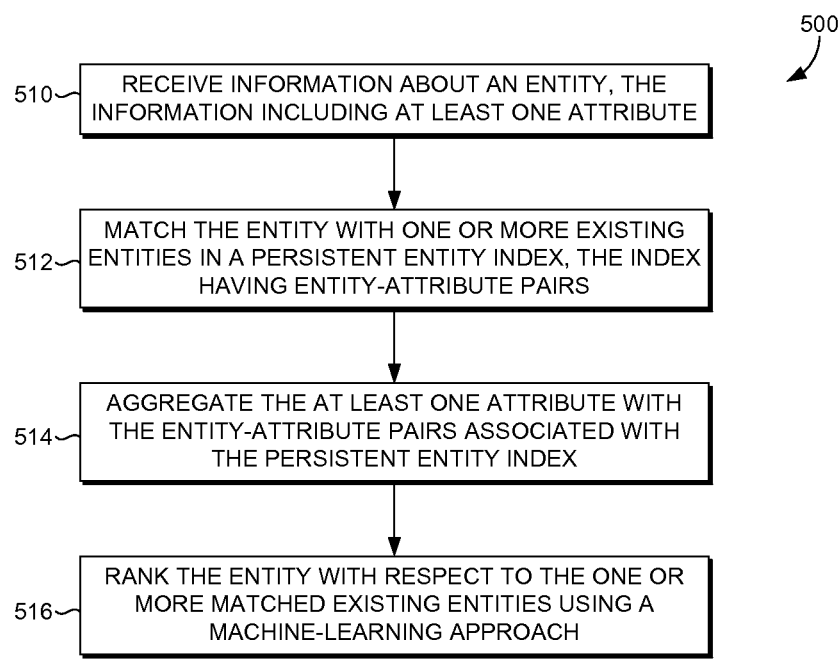
FIG. 5 is a flow diagram showing another exemplary method for conflating entities using a persistent entity index, in accordance with an embodiment of the present invention.

With reference to FIG. 5, a flow diagram is illustrated showing an exemplary method 500 for entity conflation using a persistent entity index, in accordance with an embodiment of the present invention. As indicated at block 510, information about an entity is received (e.g., utilizing the receiving component 230 of the entity conflation/knowledge processing engine 212 of FIG. 2), the information including at least one attribute associated with the entity. As indicated at block 512, the entity is matched with one or more existing entities in a persistent entity index (e.g., utilizing the matching component 234 of the entity conflation/knowledge processing engine 212 of FIG. 2). The persistent entity index has entity-attribute pairs associated therewith. As indicated at block 514, the at least one attribute associated with the entity is aggregated (e.g., utilizing the aggregating component 238 of the entity conflation/knowledge processing engine 212 of FIG. 2) with the entity-attribute pairs associated with the persistent entity index. The entity is ranked (e.g., utilizing the ranking component 236 of the entity conflation/knowledge processing engine 212 of FIG. 2) with respect to the one or more matched existing entities using a machine-learning approach. This is indicated at block 516.

As can be understood, embodiments of the present invention provide systems, methods, and computer-readable storage media for, among other things, conflating entities using a persistent entity index. Information (including attributes) pertaining to a plurality of entities is received. The received information is either matched with one or more existing entities in the persistent entity index or, if no match is found, selected for addition to the persistent entity index. The persistent entity index includes entity-attribute pairs associated therewith. Attributes associated with matching entities for which information is received are aggregated and/or reconciled with the entity-attribute pairs associated with existing entities included in the persistent entity index. In embodiments, the persistent entity index is incrementally updated at predetermined time intervals to insure the accuracy and freshness of the information associated therewith.

Utilizing embodiments of the present invention, information already associated with the persistent entity index does not need to be re-matched each time an additional item of information is received due to the persistent nature of the index. Rather, only the received information items need be matched to the already existing entities in the entity index. Thus, matching of additional information on an incremental basis is enabled, saving time and resources in maintaining the index.

The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the methods 300 of FIG. 3, 400 of FIG. 4, and 500 of FIG. 5 is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. One or more computer-readable storage media storing computer-useable instructions that, when used by one or more computing devices, cause the one or more computing devices to perform a method for entity conflation using a persistent entity index, the method comprising:
   receiving information about an entity, the information including at least one attribute associated with the entity, the at least one attribute describing a characteristic of the entity;
   matching the entity with one or more existing entities in the persistent entity index, wherein the persistent entity index includes entity-attribute pairs associated therewith and the entity-attribute pairs include all received attributes that describe one or more characteristics of an associated entity;
   determining whether the at least one attribute describing the one or more characteristics of the entity is present within the persistent entity index;
   aggregating the at least one attribute associated with the entity with the entity-attribute pairs within the persistent entity index; and
   incrementally updating the persistent entity index to include updated entity-attribute pairs including any subsequently received attributes describing one or more characteristics of the entity at a predetermined time interval.

2. The one or more computer-readable storage media of claim 1, wherein the method further comprises ranking the entity with respect to the one or more matched existing entities using a machine-learning approach.

3. The one or more computer-readable storage media of claim 1, wherein ranking the entity with respect to the one or more matched existing entities comprises ranking the entity utilizing the at least one attribute and using the machine-learning approach.

4. The one or more computer-readable storage media of claim 1, wherein receiving information about the entity comprises receiving information about the entity from an information feed.

5. The one or more computer-readable storage media of claim 4, wherein the information feed comprises at least one of structured and unstructured data.

6. The one or more computer-readable storage media of claim 1, wherein matching the entity with one or more existing entities in a persistent entity index comprises matching the entity using at least one of graph data and web context.

7. A method being performed by one or more computing devices including at least one processor, the method for maintaining a persistent entity index, the method comprising:
   receiving information about an entity from a plurality of sources, the received information including at least one attribute associated with the entity, the at least one attribute describing at least one characteristic of the entity;
   detecting a match between the information about the entity from at least two matching sources of the plurality of sources;
   aggregating the information about the entity from the at least two matching sources;
   storing the aggregated information in the persistent entity index, wherein the persistent entity index comprises a plurality of entity-attribute pairs from a first knowledge source and information acquired about entities from a second knowledge source; and
   incrementally updating the persistent entity index at a predetermined time interval to include updated entity-attribute pairs including any subsequently received attributes describing one or more characteristics of any entity of the persistent entity index.

8. The method of claim 7, wherein detecting a match between the information about the entity from the at least two of the plurality of sources comprises detecting a match in the at least one attribute from each of the at least two matching sources.

9. The method of claim 7, wherein receiving information about the entity from the plurality of sources comprises receiving the information about the entity from a plurality of information feeds.

10. The method of claim 9, wherein each of the plurality of information feeds comprises at least one of structured and unstructured data.

11. The method of claim 7, wherein detecting a match between the information about the entity from at least two of the plurality of sources comprises detecting a match using at least one of graph data and web context.

12. The method of claim 7, wherein the information about the entity from each of the at least two matching sources includes at least one attribute associated with the entity, the attribute having values associated therewith that differ between the at least two matching sources, and wherein aggregating the information about the entity from the at least two matching sources comprises reconciling the differing attribute values between the at least two matching sources.

13. A system comprising:

an entity conflation engine having one or more processors and one or more computer-readable storage media;

a data store coupled with the entity conflation engine, wherein the entity conflation engine:

receives information about an entity, the information including at least one attribute describing a characteristic of the entity;

matches the entity with one or more existing entities in a persistent entity index, wherein the persistent entity index includes entity-attribute pairs associated therewith and the entity-attribute pairs include all received attributes that describe one or more characteristics of an associated entity;

aggregates the at least one attribute associated with the entity with the entity-attribute pairs within the persistent entity index;

ranks the entity with respect to the one or more matched existing entities using a machine-learning approach; and incrementally updates the persistent entity index to include updated entity-attribute pairs including any subsequently received attributes describing one or more characteristics of the entity at a predetermined time interval.

14. The system of claim 13, wherein the entity conflation engine ranks the entity with respect to the one or more matched existing entities utilizing the at least one attribute and using the machine-learning approach.

15. The system of claim 13, wherein the entity conflation engine receives information about the entity from an information feed.

16. The system of claim 15, wherein the information feed comprises at least one of structured and unstructured data.

17. The system of claim 13, wherein the entity conflation engine matches the entity with the one or more existing entities in the persistent entity index using at least one of graph data and web context.

* * * * *